United States Patent
Kato et al.

[11] Patent Number: 5,821,204
[45] Date of Patent: Oct. 13, 1998

[54] THRUST BEARING HAVING SLIDING SURFACE

[75] Inventors: Eiji Kato; Shoji Yasunaga; Takayuki Shibayama, all of Nagoya, Japan

[73] Assignee: Daido Metal Company Ltd., Nagoya, Japan

[21] Appl. No.: 845,168

[22] Filed: Apr. 21, 1997

[30] Foreign Application Priority Data

May 31, 1996 [JP] Japan ................................. 8-160690

[51] Int. Cl.$^6$ .............................................. C10M 101/32
[52] U.S. Cl. ................... 508/106; 5108/104; 5108/105; 5108/109
[58] Field of Search ..................... 508/106, 109

[56] References Cited

U.S. PATENT DOCUMENTS

| | | | |
|---|---|---|---|
| 3,674,689 | 7/1972 | Giltrow et al. | 508/103 |
| 3,994,814 | 11/1976 | Cairns | 508/106 |
| 4,532,054 | 7/1985 | Johnson | 508/106 |
| 4,698,179 | 10/1987 | Suzuki et al. | 252/511 |
| 4,724,251 | 2/1988 | Rock | 525/104 |
| 4,737,539 | 4/1988 | Jinno et al. | 524/508 |
| 4,830,777 | 5/1989 | Suzuki et al. | 252/511 |
| 4,909,961 | 3/1990 | Suzuki et al. | 252/511 |
| 5,131,818 | 7/1992 | Wittkop et al. | 417/273 |
| 5,486,299 | 1/1996 | Fuwa et al. | 508/106 |
| 5,726,232 | 3/1998 | Egami et al. | 524/414 |

FOREIGN PATENT DOCUMENTS

| | | |
|---|---|---|
| 58-160346 | 9/1983 | Japan . |
| 05-302620 | 11/1993 | Japan . |

*Primary Examiner*—Ellen M. McAvoy
*Attorney, Agent, or Firm*—Browdy and Neimark

[57] ABSTRACT

A thrust bearing having a sliding surface composed of a resin composition which comprises 10 to 45% by weight of a carbon fiber, 0.1 to 30% by weight of a polytetrafluoroethylene, 0.1 to 20% by weight of a graphite having an oil absorption of 70 to 500 ml/100 g, the balance being substantially an aromatic polyetherketone resin wherein the total content of the carbon fiber, the polytetrafluoroethylene and the graphite is not more than 65% by weight. The sliding surface of the above thrust bearing is excellent in wear resistance and low in friction coefficient at the time of starting.

17 Claims, 2 Drawing Sheets

THRUST BEARING HAVING SLIDING SURFACE

BACKGROUND OF THE INVENTION

This invention relates to a thrust bearing having a sliding surface, more particularly to a thrust bearing having a sliding surface composed of a resin composition comprising an aromatic polyetherketone resin as the base material.

Aromatic polyetherketone resins are known as engineering resins having excellent heat resistance, mechanical properties and wear resistance. However, when the aromatic polyetherketone resin is used alone, the friction coefficient is high and the application thereof to a sliding member for bearing is difficult, so that there have heretofore been developed sliding members having a low friction coefficient by incorporating a fluorocarbon polymer or the like into an aromatic polyetherketone resin as a base material. On the other hand, the wear resistance and mechanical strength of the aromatic polyetherketone resin are deteriorated by incorporating thereinto a fluorocarbon polymer.

As a technique concerning these aromatic polyetherketone resins, there is known the technique disclosed in JP-A 58(1983)-160,346. In this prior art, there is proposed a resin composition which comprises an aromatic polyetherketone resin as a base material, 10 to 40% by weight of polytetrafluoroethylene (referred to hereinafter as PTFE) as a fluorocarbon polymer and 10 to 40% by weight of a carbon fiber. It is stated that a high heat distortion temperature (HDT) and a high limiting PV value are obtained by the above resin composition.

Recently, the area of the pad used in a thrust bearing which operates in the presence of a lubricating liquid and is incorporated into a generator, a pump or the like, has been made small accompanying the tendency of miniaturization of apparatus, and a high specific load has come to be applied to the pad. A thrust bearing applied under such severe conditions is required to have various properties such as high wear resistance and the like in addition to its excellent sliding characteristics. Moreover, in the case of, for example, a thrust bearing used in apparatus in which starting and stopping are repeatedly effected, the thrust bearing is partially in solid contact with a counter member during the stopping, and hence not only does a large starting power become necessary at the time of starting, but also there is a fear that the sliding surface is damaged. Therefore, the thrust bearing is required to have a lowered friction coefficient at the time of starting in addition to excellent wear resistance during operating.

However, the above-mentioned prior technique cannot always be said to be satisfactory in respect of wear resistance and friction coefficient at the time of starting. Furthermore, no sufficient effect has been obtained by adding a solid lubricant such as usual graphite, molybdenum disulfide or the like for lowering the friction coefficient at the time of starting.

SUMMARY OF THE INVENTION

The present inventors have made extensive research on the above-mentioned problems and have consequently found that a thrust bearing having a sliding surface composed of a resin composition obtained by adding a carbon fiber and a fluorocarbon polymer to an aromatic polyetherketone resin and also mixing therewith a graphite having an oil absorption of 70 to 500 ml/100 g enables the enhancement of the wear resistance and also enables the lowering of the friction coefficient at the time of starting, and have completed this invention.

This invention aims at providing a thrust bearing having a sliding surface composed of a resin composition in which an aromatic polyetherketone resin is used as a base material.

According to this invention, there is provided a thrust bearing having a sliding surface composed of a resin composition comprising a carbon fiber, a fluorocarbon polymer, a graphite having an oil absorption of 70 to 500 ml/100 g and an aromatic polyetherketone resin, in which composition the content of the carbon fiber is 10 to 45% by weight, the content of the fluorocarbon polymer is 0.1 to 30% by weight, the content of the graphite having an oil absorption of 70 to 500 ml/–100 g is 0.1 to 20% by weight and the total content of the carbon fiber, the fluorocarbon polymer and the graphite having an oil absorption of 70 to 500 ml/100 g is not more than 65% by weight.

DETAILED DESCRIPTION OF THE INVENTION

Figure 1:
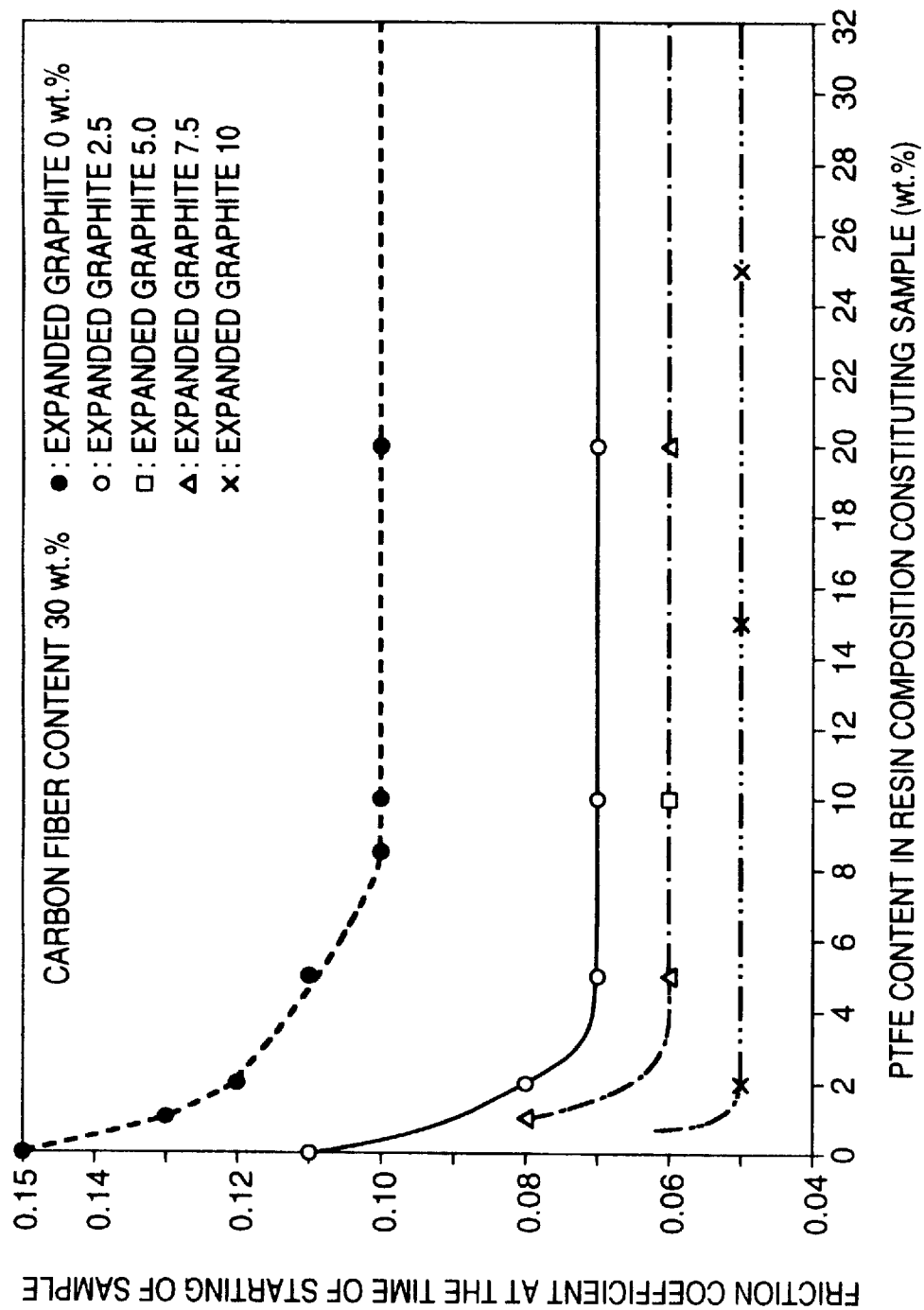
FIG. 1 is a graph showing a relation between the friction coefficient at the time of starting and the content of PTFE of a sample used in the Examples.

The aromatic polyetherketone resin is a crystalline, thermoplastic, aromatic resin comprising a constructive unit represented by the formula (1) alone or in combination with at least one of the constructive units represented by the formulas (2), (3) and (4):

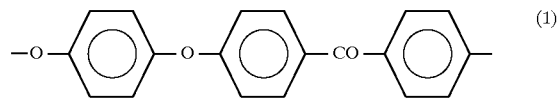

(1)

(2)

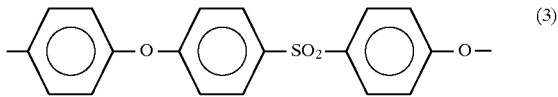

(3)

(4)

The above aromatic polyetherketone resin is desirably polyetheretherketone (referred to hereinafter as PEEK) in view of mechanical strength and heat resistance. PEEK can be produced by, for example, the method described in JP-A 54(1979)-90,296, and the melt flow index thereof as measured according to ASTM D1238 at 360° C. under a load of 2.16 Kg is desirably 1 to 5 g/10 min.

As the fluorocarbon polymer, there can be used polytetrafluoroethylene (PTEF), polytetrafluoroethylene-hexafluoropropylene copolymer (FEP), polychlorotrifluoroethylene (PCTFE), tetrafluoroethylene-perfluoroalkyl vinyl ether copolymer (PFA) and the like. In particular, PTFE is desirable in view of low friction.

When the content of the fluorocarbon polymer is less than 0.1% by weight, no sufficient effect is exerted by addition thereof. On the other hand, when the content exceeds 30% by weight, it becomes impossible to obtain a sufficient strength. Therefore, the content of the fluorocarbon polymer should be 0.1 to 30% by weight. In particular, it is desirable that the content of fluorocarbon polymer is 1 to 9% by weight because the wear resistance is excellent.

As the carbon fiber, there can be used any of pitch-based carbon fibers, cellulose-based carbon fibers, polyacrylonitrile-based carbon fibers and the like, and the polyacrylonitrile-based carbon fibers are particularly desirable from the viewpoint of friction and wear. The length of the fiber is preferably 0.1 to 10 mm and usually, carbon fibers having an average length of about 6 mm are used.

When the content of the carbon fiber is less than 10% by weight, no desired mechanical strength is obtained. On the other hand, when the content exceeds 45% by weight, the molding of the resin composition becomes difficult. Therefore, the content of the carbon fiber should be 10 to 45% by weight, and particularly, a content of carbon fiber of 25 to 35% by weight is desirable because the moldability is good and the mechanical strength is excellent.

The graphite usually has an oil absorption of about 50 ml per 100 g. The term "usual graphite" used herein means a graphite having an oil absorption of less than 70 ml per 100 g. Graphite which has been subjected to expansion treatment to enlarge the distances between graphite crystalline faces and has consequently many spaces, is excellent in oil absorption and oil retention. Thus, the graphite having an oil absorption of at least 70 ml per 100 g is referred to hereinafter as the expanded graphite in contrast with the usual graphite mentioned above.

With the sliding member having a sliding surface containing the usual graphite, it cannot be so much expected that the friction coefficient at the time of starting is lowered. In addition, particles of the expanded graphite having an oil content of more than 500 ml per 100 g have large particle diameters and the dispersibility thereof in the aromatic polyetherketone resin when mixed therewith is lowered. Therefore, the oil absorption of the expanded graphite should be 70 ml to 500 ml/100 g. In particular, in view of strength, the expanded graphite has desirably an oil absorption of 80 ml to 300 ml per 100 g, and more desirably an oil absorption of 80 ml to 150 ml per 100 g.

When the content of the expanded graphite is less than 0.1% by weight, no effect of addition thereof is obtained. On the other hand, when the content exceeds 20% by weight, the molding becomes difficult. Therefore, the content of the expanded graphite should be 0.1 to 20% by weight. In particular, in view of wear resistance, the content is desirably 1 to 10% by weight.

In addition, it is possible to add 0.1 to 20% by weight of a solid lubricant such as molybdenum disulfide ($MoS_2$), the usual graphite or the like to lower the friction coefficient at the time of starting. Moreover, metal oxides and ceramics can be added to further heighten the wear resistance.

Incidentally, when the total content of the carbon fiber, fluorocarbon polymer and expanded graphite which are incorporated with the aromatic polyetherketone resin exceeds 65% by weight, the molding becomes difficult. Therefore, the total content of these constituents should be not more than 65% by weight.

It is desirable that each of the fluorocarbon polymer, carbon fiber and expanded graphite which are incorporated with the aromatic polyetherketone resin is uniformly dispersed, and these constituents are sufficiently mixed by an appropriate method such as a method in which these constituents are previously mixed in a mixer so that the desired content ratio is obtained and thereafter the mixture is fed to a melt-extruder, or the like.

Moreover, the thrust bearing having a sliding surface of this invention may be a single layer thrust bearing obtained by molding the resin composition and also may be a multilayer thrust bearing obtained by coating the resin composition on a backing metal or impregnation-coating the resin composition in and on a porous sintered layer backed with a metal.

As explained above, according to this invention, there can be obtained a thrust bearing having a sliding surface having excellent wear resistance and a low friction coefficient at the time of starting.

Furthermore, when the thrust bearing having a sliding surface according to this invention is incorporated into a thrust bearing means of a generator, a pump or the like, the friction coefficient at the time of starting can be lowered and a damage is hardly caused at the time of starting, and hence, there is obtained a thrust bearing means having a simple structure which needs not be provided with an oil lifter means by which an oil is fed through a hydraulic means which has heretofore been necessary to forcibly lift up the counter member from the sliding surface.

DESCRIPTION OF THE PREFERRED EMBODIMENTS

Examples and Comparative Examples are shown below to explain this invention in more detail.

EXAMPLES 1 TO 29 AND COMPARATIVE EXAMPLES 1 TO 15

The components shown in Tables 1 to 3 were mixed in the amounts shown in Tables 1 to 3 in a mixer to prepare a uniformly compounded pellet-shaped resin. The pellet-shaped resin was formed into a resin plate of 5 mm in thickness by an injection machine.

TABLE 1

| Sample No. | | PEEK | Composition | | | | Characteristics | |
|---|---|---|---|---|---|---|---|---|
| | | | Carbon fiber (wt. %) | PTFE (wt. %) | Expanded graphite (wt. %) | Usual graphite (wt. %) | Friction coefficient at the time of starting | Wear ($\mu$m) |
| Example | 1 | Balance | 30 | 2 | 2.5 | | 0.08 | 1.3 |
| | 2 | Balance | 30 | 5 | 2.5 | | 0.07 | 1.6 |
| | 3 | Balance | 30 | 10 | 2.5 | | 0.07 | 3.3 |
| | 4 | Balance | 30 | 20 | 2.5 | | 0.07 | 3.7 |
| | 5 | Balance | 30 | 5 | 5.0 | | 0.06 | 1.6 |
| | 6 | Balance | 30 | 10 | 5.0 | | 0.06 | 2.8 |
| | 7 | Balance | 30 | 20 | 5.0 | | 0.06 | 3.2 |

TABLE 1-continued

|  | Sample No. | PEEK | Carbon fiber (wt. %) | PTFE (wt. %) | Expanded graphite (wt. %) | Usual graphite (wt. %) | Friction coefficient at the time of starting | Wear (μm) |
| --- | --- | --- | --- | --- | --- | --- | --- | --- |
|  | 8 | Balance | 30 | 1 | 7.5 |  | 0.08 | 1.8 |
|  | 9 | Balance | 30 | 2 | 7.5 |  | 0.08 | 1.2 |
|  | 10 | Balance | 30 | 5 | 7.5 |  | 0.06 | 1.3 |
|  | 11 | Balance | 30 | 20 | 7.5 |  | 0.06 | 3.0 |
|  | 12 | Balance | 30 | 2 | 10 |  | 0.05 | 1.3 |
|  | 13 | Balance | 30 | 15 | 10 |  | 0.05 | 2.7 |
|  | 14 | Balance | 30 | 25 | 10 |  | 0.05 | 3.5 |

TABLE 2

|  | Sample No. | PEEK | Carbon fiber (wt. %) | PTFE (wt. %) | Expanded graphite (wt. %) | Usual graphite (wt. %) | Friction coefficient at the time of starting | Wear (μm) |
| --- | --- | --- | --- | --- | --- | --- | --- | --- |
| Example | 15 | Balance | 10 | 0.1 | 5.0 |  | 0.06 | 3.7 |
|  | 16 | Balance | 10 | 2 | 5.0 |  | 0.06 | 3.2 |
|  | 17 | Balance | 10 | 10 | 5.0 |  | 0.06 | 3.3 |
|  | 18 | Balance | 20 | 2 | 7.5 |  | 0.05 | 2.7 |
|  | 19 | Balance | 20 | 10 | 7.5 |  | 0.05 | 3.0 |
|  | 20 | Balance | 45 | 2 | 5.0 |  | 0.07 | 2.8 |
|  | 21 | Balance | 45 | 10 | 5.0 |  | 0.06 | 2.4 |
|  | 22 | Balance | 30 | 2 | 7.5 | 2.5 | 0.07 | 1.2 |
|  | 23 | Balance | 30 | 2 | 2.5 | 1) 2.5 | 0.07 | 1.2 |
|  | 24 | Balance | 10 | 0.1 | 0.1 |  | 0.08 | 3.9 |
|  | 25 | Balance | 30 | 5 | 2) 5.0 |  | 0.06 | 2.0 |
|  | 26 | Balance | 30 | 15 | 1.0 |  | 0.07 | 3.5 |
|  | 27 | Balance | 30 | 20 | 15.0 |  | 0.05 | 3.9 |
|  | 28 | Balance | 30 | 5 | 3) 5.0 |  | 0.07 | 2.1 |
|  | 29 | Balance | 30 | 5 | 4) 5.0 |  | 0.07 | 2.2 |

1) MoS$_2$
2) Oil absorption of 150 ml/100 g
3) Oil absorption of 300 ml/100 g
4) Oil absorption of 500 ml/100 g

TABLE 3

|  | Sample No. | PEEK | Carbon fiber (wt. %) | PTFE (wt. %) | Expanded graphite (wt. %) | Usual graphite (wt. %) | Friction coefficient at the time of starting | Wear (μm) |
| --- | --- | --- | --- | --- | --- | --- | --- | --- |
| Comparative Example | 1 | Balance | 30 |  |  |  | 0.15 | 7.2 |
|  | 2 | Balance | 30 | 1 |  |  | 0.13 | 3.0 |
|  | 3 | Balance | 30 | 2 |  |  | 0.12 | 2.8 |
|  | 4 | Balance | 30 | 5 |  |  | 0.11 | 3.5 |
|  | 5 | Balance | 30 | 8.5 |  |  | 0.10 | 4.0 |
|  | 6 | Balance | 30 | 10 |  |  | 0.10 | 6.9 |
|  | 7 | Balance | 30 | 20 |  |  | 0.10 | 6.9 |
|  | 8 | Balance | 30 |  | 2.5 |  | 0.11 | 5.2 |
|  | 9 | Balance | 30 | 2 |  | 2.5 | 0.11 | 3.0 |
|  | 10 | Balance | 30 | 2 |  | 5.0 | 0.11 | 3.4 |
|  | 11 | Balance | 30 | 5 |  | 5.0 | 0.10 | 3.9 |
|  | 12 | Balance | 20 | 30 | 20 | 5.0 | — | — |
|  | 13 | Balance | 40 | 20 | 20 |  | — | — |
|  | 14 | Balance | 30 | 20 | 15 | 10 | — | — |
|  | 15 | Balance | 7 | 10 | 5 |  | 0.09 | 4.5 |

As the aromatic polyetherketone resin, PEEK was used. As the PEEK, there was used PEEK 450G (a trade name of ICI in U.K.) having a melt flow index of 3.1 g/10 min.

As the fluorocarbon polymer, there was used TLP-10 (a trade name for PTFE of Mitsui Dupont Fluorochemical Co., Ltd.).

As the carbon fiber, there was used Torayca MDL (a trade name for polyacrylonitrile-based carbon fiber of TORAY INDUSTRIES, INC.) having a fiber length of 6 mm.

As the expanded graphite, one manufactured by Nippon Graphite Industries Co., Ltd. was used. The oil absorption thereof was 80 ml/100 g; however, in Example 25, it was 150 ml/100 g, in Example 28, 300 ml/100 g, and in Example 29, 500 ml/100 g.

The usual graphite used in the Comparative Examples was those having an oil absorption of 50 ml/100 g manufactured by Nippon Graphite Industries Co., Ltd.

Subsequently, a copper alloy powder was spreaded in a thickness of 0.5 mm on a copper-plated steel plate having a thickness of 3 mm and then sintered to form a porous sintered layer. This porous sintered layer was heated to 350°–400° C., and in this state, the above-mentioned resin plate was overlaid on the porous sintered layer, pressure-welded thereon by a press and impregnation-coated thereon. Subsequently, the resulting assembly was processed into a washer ring having an outer diameter of 27.2 mm and an inner diameter of 22 mm, to obtain test samples for the Examples and the Comparative Examples.

Each of the test samples obtained was subjected to a friction and wear test using a thrust type friction and wear tester under the conditions shown in Table 4. The test was effected in an oil bath by repeating 15 times a cycle of rotation for 30 sec and rest for 300 sec and measuring friction coefficient at the time of starting in the last five repetitions. The average value of the five data obtained was used as the friction coefficient at the time of starting.

TABLE 4

| Test conditions | Dimension | Unit |
|---|---|---|
| Test sample dimension | φ27.2 × φ22 | mm |
| Number of revolutions | 1500 | rpm |
| Peripheral speed | 2 | m/sec |
| Pressure | 10 | MPa |
| Lubricating oil | VG46 | — |
| Lubricating oil temp. | 55 | °C. |
| Lubricating method | Oil bath | — |
| Counter member | | |
| Material | S45C | — |
| Roughness | 1.0 | Rmax μm |
| Hardness | 180–220 | Hv10 |

The wear was determined from the difference between the thicknesses of a test sample before and after the test. The test results obtained are shown in Tables 1 to 3.

FIG. 1 graphically shows the influence of the contents of PTFE and the expanded graphite on the friction coefficient at the time of starting based on the test results obtained in Examples 1 to 14 and Comparative Examples 1 to 8 in which 30% by weight of the carbon fiber was used. As is clear from FIG. 1 and Tables 1 to 3, Comparative Examples 1 to 7 in which no expanded graphite was used showed that when the content of PTFE was up to about 10% by weight, the larger was the PTFE content, the lower the friction coefficient at the time of starting became, and when the PTFE content was more than about 10% by weight, the friction coefficient at the time of starting was a substantially constant value of 0.10. On the other hand, Examples 1 to 4 in which the expanded graphite having an oil absorption of 80 ml/100 g was used in an amount of 2.5% by weight showed such results that when the PTFE content was up to 5% by weight, the friction coefficient at the time of starting became low and when the PTFE content exceeded 5% by weight, the friction coefficient was a substantially constant value of 0.07. In Examples 1 to 14 in which the content of the expanded graphite was 2.5, 5.0, 7.5 or 10% by weight, the friction coefficient at the time of starting was lowered as the content of the expanded graphite was increased. Also, as the content of the expanded graphite was increased, the PTFE content, in which the friction coefficient at the time of starting became a low and constant value, was lowered. Example 12 showed that when the content of the expanded graphite became 10% by weight, the friction coefficient at the time of starting was 0.05 in a PTFE content of 2% by weight.

From the above test results, it can be seen that the expanded graphite has an effect of lowering the friction coefficient at the time of starting and when PTFE is co-used the said effect is further increased.

Figure 2:
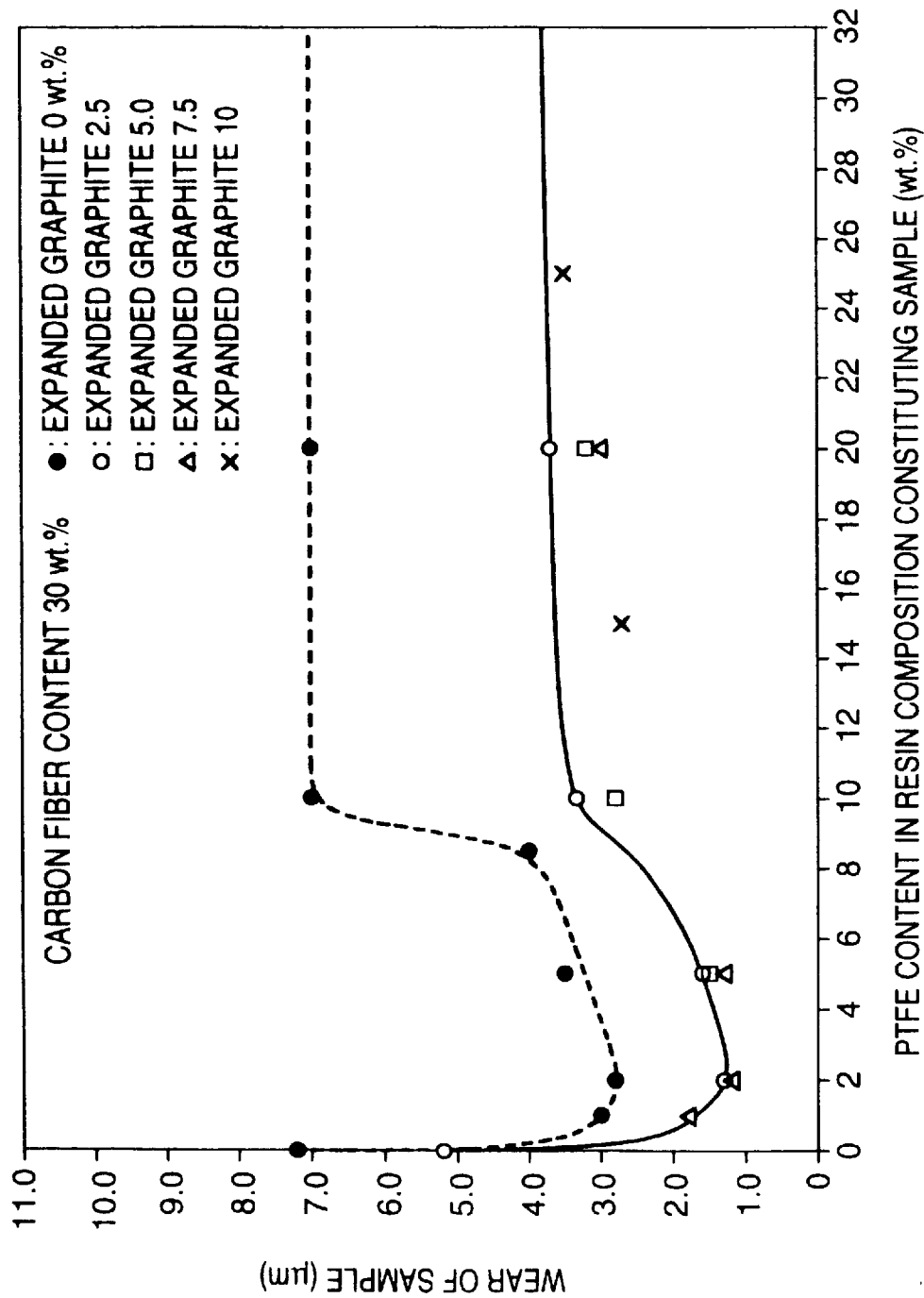
FIG. 2 is a graph showing a relation between wear and the content of PTFE of the same sample as in FIG. 1.

FIG. 2 graphically shows the influence on wear of the content of PTFE and the expanded graphite. As is clear from FIG. 2 and Tables 1 to 3, Comparative Examples 1 to 7 in which the content of the carbon fiber was 30% by weight and no expanded graphite was used showed that when the PTFE content was 0% by weight (Comparative Example 1), the wear was 7.2 μm and when the PTFE content was 2% by weight (Comparative Example 3), the wear was 2.8 μm. However, it is clear that the wear was rapidly increased from the point of a PTFE content of 10% by weight, and the wear was a substantially constant value of 7 μm in the PTFE contents of more than 10% by weight. In Examples 1 to 14 in which the expanded graphite was used, the wear was reduced as compared with each of Comparative Examples 1 to 7 in which PTFE was used in the same amount, and hence, an effect of incorporating the expanded graphite was obtained.

Furthermore, when Comparative Example 11 in which the usual graphite having an oil absorption of 50 ml/100 g was used is compared with Examples 5, 25, 28 and 29 in which the expanded graphites used had oil absorptions of 80, 150, 300 and 500 ml/100 g, respectively, it is clear that Comparative 11 was inferior in both friction coefficient at the time of starting and wear.

Examples 22 and 23 were examples of the addition of a solid lubricant to Examples 9 and 1, respectively, and showed that the friction coefficient at the time of starting was enhanced.

In addition, on the carbon fiber, the comparison of Examples 6, 17 and 21 with Comparative Example 15 shows that by adding at least 10% by weight of the carbon fiber, the friction and wear characteristics are enhanced.

Comparative Examples 12 to 14 are examples in which the total content of the carbon fiber, the PTFE, the expanded graphite and the solid lubricant exceeded 65% by weight, and showed that molding was difficult and no test sample was obtained.

What is claimed is:

1. A thrust bearing having a sliding surface composed of a resin composition which comprises a carbon fiber, a fluorocarbon polymer, a graphite having an oil absorption of 70 to 500 ml/100 g and an aromatic polyetherketone resin, wherein the content of the carbon fiber is 10 to 45% by weight, the content of the fluorocarbon polymer is 0.1 to 30% by weight, the content of the graphite having an oil absorption of 70 to 500 ml/100 g is 0.1 to 20% by weight, and the total content of the carbon fiber, the fluorocarbon polymer and the graphite having an oil absorption of 70 to 500 ml/100 g is not more than 65% by weight.

2. The thrust bearing according to claim 1, wherein the carbon fiber is selected from the group consisting of a pitch-based carbon fiber, a cellulose-based carbon fiber and a polyacrylonitrile-based carbon fiber.

3. The thrust bearing according to claim 1, wherein the carbon fiber is a polyacrylonitrile-based carbon fiber.

4. The thrust bearing according to claim 1, wherein the carbon fiber has a fiber length of 0.1 to 10 mm.

5. The thrust bearing according to claim 1, wherein the content of the carbon fiber is 25 to 35% by weight.

6. The thrust bearing according to claim 1, wherein the fluorocarbon polymer is at least one member selected from the group consisting of polytetrafluoroethylene, polytetrafluoroethylene-hexafluoropropylene copolymer, polychlorotrifluoroethylene and tetrafluoroethylene-perfluoroalkyl vinyl ether copolymer.

7. The thrust bearing according to claim 1, wherein the fluorocarbon polymer is polytetrafluoroethylene.

8. The thrust bearing according to claim 1, wherein the content of the fluorocarbon polymer is 1 to 9% by weight.

9. The thrust bearing according to claim 1, wherein the graphite is one having an oil absorption of 80 to 300 ml/100 g.

10. The thrust bearing according to claim 1, wherein the content of the graphite is 1 to 10% by weight.

11. The thrust bearing according to claim 1, wherein the aromatic polyetherketone resin is polyetheretherketone.

12. The thrust bearing according to claim 11, wherein the polyetheretherketone has a melt flow index of 1 to 5 g/10 min as measured at 360° C. under a load of 2.16 Kg.

13. The thrust bearing according to claim 1, wherein the resin composition further contains a solid lubricant other than the graphite having an oil absorption of 70 to 500 ml/100 g.

14. The thrust bearing according to claim 13, wherein the solid lubricant is selected from the group consisting of molybdenum disulfide and a graphite having an oil absorption of less than 70 ml/100 g.

15. The thrust bearing according to claim 1, wherein the balance of the resin composition is substantially the aromatic polyetherketone resin.

16. The thrust bearing according to claim 1, which is a multilayer thrust bearing obtained by impregnation-coating the resin composition according to claim 1 on a porous, sintered layer backed with a metal.

17. The thrust bearing according to claim 1, which is a single layer thrust bearing obtained by molding the resin composition according to claim 1.

* * * * *